(12) United States Patent
Raskin et al.

(10) Patent No.: US 7,059,057 B2
(45) Date of Patent: Jun. 13, 2006

(54) LASER LEVEL

(75) Inventors: James R. Raskin, Ellicott City, MD (US); Jeffrey A. Cooper, Ellicott City, MD (US); James D. Marshall, Mallorytown (CA); Oleksiy P. Sergyeyenko, Brockville (CA); Thomas J. Wheeler, Pomona, CA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/689,012

(22) Filed: Oct. 20, 2003

(65) Prior Publication Data

US 2004/0083614 A1    May 6, 2004

Related U.S. Application Data

(63) Continuation of application No. 10/277,474, filed on Oct. 22, 2002, now Pat. No. 6,914,930.

(60) Provisional application No. 60/384,673, filed on May 31, 2002.

(51) Int. Cl.
*G01C 15/00* (2006.01)

(52) U.S. Cl. .............................. 33/286; 33/281; 33/291; 33/DIG. 21

(58) Field of Classification Search .......... 33/281–283, 33/285–286, 290–292, DIG. 21, 347, DIG. 1
See application file for complete search history.

(56) References Cited

U.S. PATENT DOCUMENTS

| | | | |
|---|---|---|---|
| 4,099,118 A | | 7/1978 | Franklin et al. |
| 4,388,890 A | * | 6/1983 | Wester et al. ............. 33/DIG. 1 |
| 4,700,489 A | * | 10/1987 | Vasile ......................... 33/342 |
| 4,836,671 A | * | 6/1989 | Bautista ....................... 356/3.1 |
| 4,947,616 A | * | 8/1990 | Sorton ........................... 33/613 |
| 5,063,679 A | * | 11/1991 | Schwandt ..................... 33/347 |
| 5,075,977 A | | 12/1991 | Rando |
| 5,148,108 A | * | 9/1992 | Dufour ......................... 324/226 |
| 5,195,248 A | * | 3/1993 | Juhasz ........................... 33/347 |
| 5,218,770 A | * | 6/1993 | Toga ..................... 33/DIG. 21 |
| 5,539,990 A | * | 7/1996 | Le ................................ 33/283 |
| 5,594,993 A | | 1/1997 | Tager et al. |
| 5,872,657 A | | 2/1999 | Rando |
| 6,202,312 B1 | * | 3/2001 | Rando ........................... 33/286 |
| 6,211,662 B1 | | 4/2001 | Bijawat et al. |
| 6,431,508 B1 | * | 8/2002 | Courson et al. ......... 248/205.3 |
| 6,502,319 B1 | * | 1/2003 | Goodrich et al. ............. 33/286 |
| 6,708,421 B1 | * | 3/2004 | Crorey ................... 33/DIG. 1 |
| 6,735,879 B1 | * | 5/2004 | Malard et al. ................ 33/286 |

(Continued)

FOREIGN PATENT DOCUMENTS

DE   199 11 542 A   6/2000

OTHER PUBLICATIONS

M. Santos, European Search Report Application No. EP 03 00 1590, Oct. 19, 2004, The Hague.

(Continued)

*Primary Examiner*—Yaritza Guadalupe
(74) *Attorney, Agent, or Firm*—Wesley W. Muller; Bruce S. Shapiro; Johnathan Yun (57) ABSTRACT

A laser level disposable on a reference surface includes a housing, a pendulum pivotably connected to the housing, a first laser diode disposed on the pendulum for emitting a first laser beam along a first path, and a lens disposed on the pendulum in the first path for converting the first laser beam into a first planar beam, the first planar beam forming a line on the reference surface.

9 Claims, 9 Drawing Sheets

U.S. PATENT DOCUMENTS

| | | | | |
|---|---|---|---|---|
| 6,829,834 B1 * | 12/2004 | Krantz | ........................ | 33/286 |
| 6,931,740 B1 * | 8/2005 | Marshall et al. | ............... | 33/286 |
| 6,938,350 B1 * | 9/2005 | Hersey | ........................ | 33/286 |
| 6,941,665 B1 * | 9/2005 | Budrow et al. | ............... | 33/286 |

OTHER PUBLICATIONS

Annex to the European Search Report on European Patent Application No. EP 03 00 1590.

M. Santos, European Search Report Application No. EP 03 00 1592, Oct. 20, 2004, The Hague.

Annex to the European Search Report on European Patent application No. EP 03 00 1592.

M. Santos, European Search Report Application No. EP 03 00 1591, Oct. 22, 2004, The Hague.

Annex to the European Search Report on European Patent Application No. EP 03 00 1591.

* cited by examiner

LASER LEVEL

CROSS-REFERENCE TO RELATED APPLICATIONS

The present application is a continuation of U.S. patent application Ser. No. 10/277,474, filed on Oct. 22, 2002, now U.S. Pat. No. 6,914,930, which in turn claims priority under 35 USC § 119(e) of U.S. Application No. 60/384,873, filed on May 31, 2002.

FIELD OF THE INVENTION

This invention relates generally to laser instruments and specifically to laser levels.

BACKGROUND OF THE INVENTION

Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels would be useful include laying tile, mounting cabinets, installing counter tops, and building outdoor decks.

It is an object of the present invention to provide a laser level that is inexpensive and usable by the general public.

SUMMARY OF THE INVENTION

In accordance with the present invention, an improved laser level is employed. The laser level disposable on a reference surface includes a housing, a pendulum pivotably connected to the housing, a first laser diode disposed on the pendulum for emitting a first laser beam along a first path, and a lens disposed on the pendulum in the first path for converting the first laser beam into a first planar beam, the first planar beam forming a line on the reference surface.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 3 illustrates different laser diode/lens arrangements, where

FIG. 4 illustrates another laser diode/lens arrangement, where

FIG. 5 illustrates the laser level being used with a target, where

FIG. 6 illustrates the target of FIG. 5, where

FIG. 8 is a partial cross-section of a second embodiment of the laser level, where

FIG. 10 illustrates a third embodiment of the laser level, where

FIG. 13 illustrates a fourth embodiment of the laser level, where

DETAILED DESCRIPTION

Figure 1:
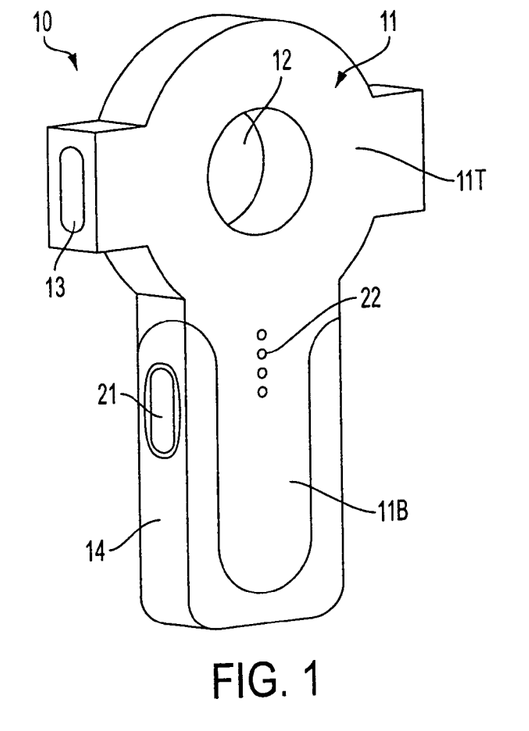
FIG. 1 is a perspective view of a first embodiment of a laser level according to the invention.
Figures 2, 3D, 3E:
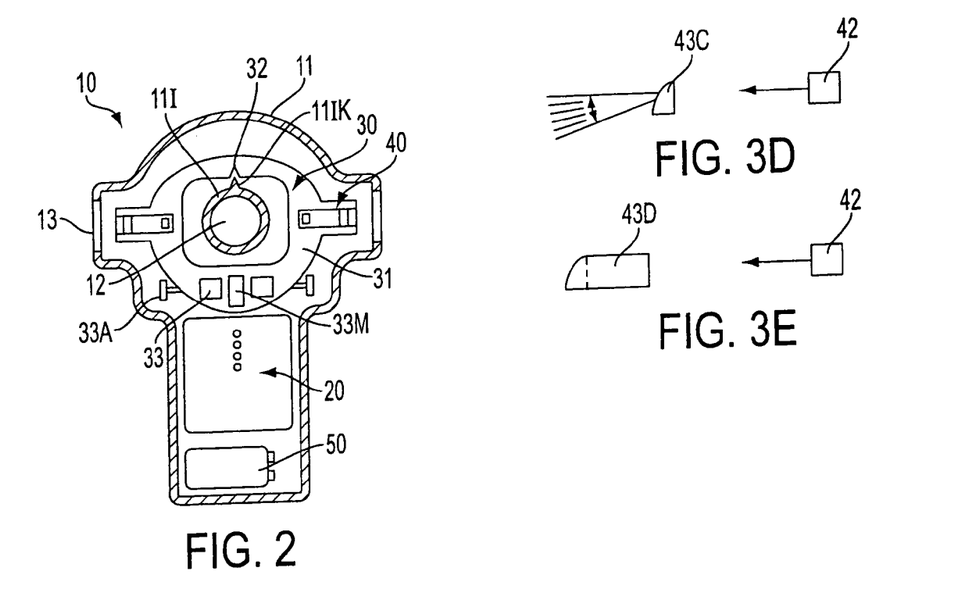
FIG. 2 is a cross-sectional view of the laser level of FIG. 1.
FIGS. 3B–3E are top views of alternate arrangements.

The invention is now described with reference to the accompanying figures, wherein like numerals designate like parts. Referring to FIGS. 1–2, a laser level 10 may have a housing 11. The housing 11 may have a top portion 11T and a bottom portion 11B. The housing may also have a hole 12 extending through the housing 11. The hole 12 preferably extends through the top portion 11T. The perimeter of the hole 12 may be defined by an inner wall 11I.

The top portion 11T may carry a pendulum assembly 30. Preferably, the pendulum assembly 30 has a main body 31, which may be made of metal or plastic. Main body 31 may be disposed on a knife edge 11K. Knife edge 11K may be connected to and/or supported by inner wall 11I. Alternatively, knife edge 11K may be connected to and/or supported by housing 11. Persons skilled in the art will recognize that pendulum assembly 30 may be supported by means other than knife edge 11K, such as a pin, bearing, point or other pendulous means.

The main body 31 may carry at least one laser assembly 40 and preferably two laser assemblies 40 disposed left and right of the knife edge 11K. Persons skilled in the art will recognize that a laser assembly 40 may disposed above knife edge 11K. Persons skilled in the art will also recognize that the laser assemblies 40 will emit laser beams. Accordingly, it is preferable to provide housing 11 with windows 13 to allow the laser beams to exit from housing 11.

Persons skilled in the art will recognize that such arrangement will provide a self-leveling pendulum assembly that will emit substantially horizontal laser beams (and a substantially vertical laser beam if a laser assembly 40 is disposed above knife edge 11K and is directed upwardly) when laser level 10 is disposed against a wall. Persons skilled in the art will also recognize that it is preferable to allow laser assembly 40 to be angularly adjusted along a vertical plane relative to main body 31, to ensure that the projected laser beam is substantially horizontal when the main body 31 is at its stationary position.

Figure 8A:
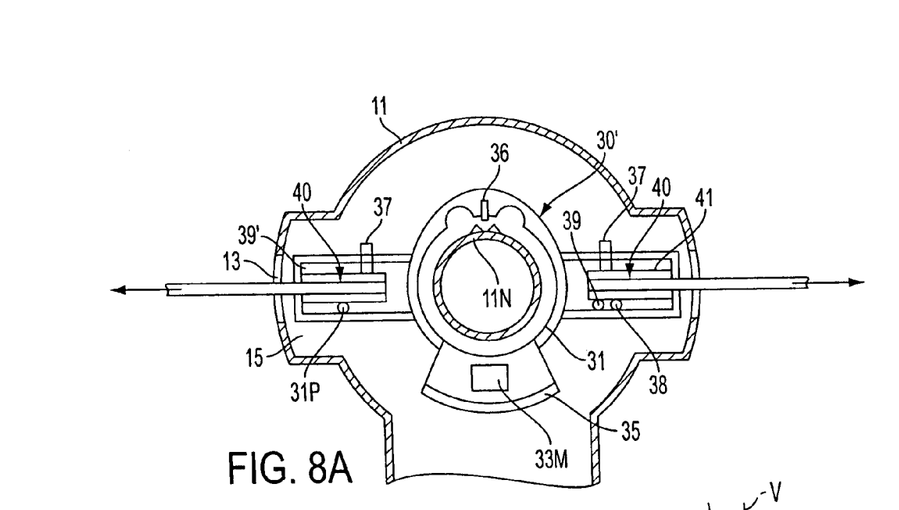
FIGS. 8A–8B show the laser level in vertical and inclined positions, respectively.

A possible adjustment arrangement is shown in FIG. 8A, where laser assembly 40 has a barrel 41 carrying the laser diode and lens(es) (not shown). Barrel 41 may be disposed on a pin 38 supported by main body 31. A spring 39 preferably disposed between barrel 41 and main body 31 may bias barrel 40 upwardly against set screw 37. Set screw 37 is preferably disposed on main body 31 and contacts barrel 41 to stop rotation of barrel 41 about pin 38, and set the position of barrel 41 (and thus of laser assembly 40). Persons skilled in the art will recognize that the set screw 37 is preferably locked in place using a locking compound such as Loc-Tite.

A second possible adjustment arrangement is also shown in FIG. 8A, where like numerals refer to like parts. In this arrangement, barrel 41 may be disposed against a protrusion 31P by main body 31. A spring 39' preferably disposed between barrel 41 and main body 31 may bias barrel 40 downwardly against set screw 37. Set screw 37 is preferably disposed on main body 31 and contacts barrel 41 to stop rotation of barrel 41 about protrusion 31P, and set the position of barrel 41 (and thus of laser assembly 40). Persons skilled in the art will recognize that the set screw 37 is preferably locked in place using a locking compound such as Loc-Tite.

Referring to FIGS. 1–2, main body 31 may also have weights 33 to provide a lower center of gravity, and enhance the performance of the pendulum assembly 30. In addition, main body 31 may have at least one adjustment screw 33A to adjust the center of gravity of pendulum assembly 30, as necessary.

Main body 31 may also have a plaque 33M, made of magnetic material, ferrous material or non-ferrous conductive material, such as zinc or copper. Plaque 33M preferably is aligned with at least one magnet (and preferably two magnets) disposed in housing 11, e.g., on the inside of the front and rear walls of housing 11, for providing a damping action on pendulum assembly 30. Basically, eddie currents are generated within plaque 33M, as the plaque moves and interacts with the magnetic field supplied by the magnet(s).

Persons skilled in the art shall recognize that pendulum assembly 30 is preferably wholly contained within housing 11. However, the pendulum assembly 30 may be at least partly, if not completely, disposed outside of housing 11.

Persons skilled in the art shall recognize that a damping mechanism for damping the motion of pendulum assembly 30 may be provided. Persons skilled in the art are directed to the damping mechanism disclosed in U.S. Pat. No. 5,144,487, which is wholly incorporated by reference herein, as well as to its equivalents.

The bottom portion 11B of housing 11 may carry a battery 50 for powering the laser assemblies 40. In addition, the bottom portion 11B may carry a stud sensor circuit 20. The circuitry of the stud sensor circuit 20 is not illustrated herein. Persons skilled in the art are referred to U.S. Pat. Nos. 4,099,118 and 4,464,622, which are wholly incorporated herein by reference.

As is well known in the art, the stud sensor circuit 20 may include an on/off actuator or switch 21, which can be a push-button type actuator. Stud sensor circuit 20 may also include light emitting diodes 22 to display the location of a stud.

It is preferable to align the sensors within stud sensor circuit 20 with the center of hole 12, so that the center of hole 12 indicates the location of the stud.

Persons skilled in the art should recognize that detector circuits other than stud sensor circuit 20 may be provided in laser level 10. Preferably, these detector circuits can detect features underneath a surface, such as a wall or floor. These features may include pipes or wires. Circuits for pipe and wire detectors, as well as other detector circuits, are well known in the art.

The housing 11 may be formed from a hard impact resistant, preferably moldable material such as a hard thermoplastic material such as ABS or polystyrene. It is preferable to provide a grip 14 on bottom portion 11B. Grip 14 may be made of a soft or low durometer thermoplastic elastomer. In addition, grip 14 can be formed from any of the so-called "soft-touch" elastomer materials, such as those sold under the tradenames "Santoprene", "Kraton" and "Monprene," and are preferably adhered or overmolded to the housing 11.

Referring to FIGS. 2–3, laser assemblies 40 are disposed on main body 31. Laser assembly 40 may include a substantially cylindrical barrel 41, which may be adjustably connected to main body 31, laser diode 42 disposed in barrel 41, and a line lens 43 disposed in barrel 41. Persons skilled in the art will recognize that in the preferred embodiment, adjusting barrel 41 will result in moving laser diode 42 and line lens 43. In addition, persons skilled in the art will recognize that a collimating lens may be disposed between laser diode 42 and line lens 43.

Figure 3A:
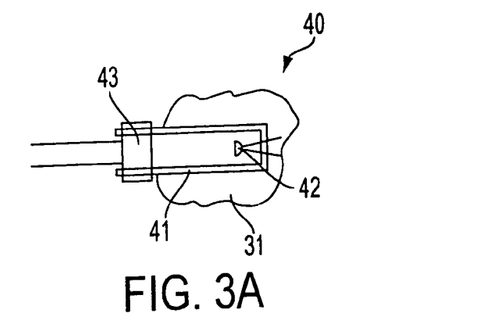
FIG. 3A is a partial cross-sectional front view of an arrangement.
Figure 3B:
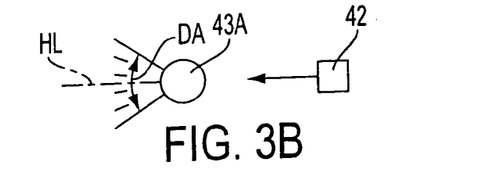
Figure 3C:
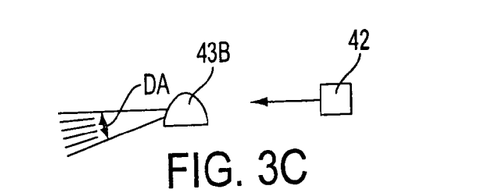

Preferably, line lens 43 converts the laser beam exiting laser diode 42 into a planar beam. Line lens 43 may have different shapes to accomplish such purpose. For example, as shown in FIGS. 3B–3D, line lenses 43A, 43B, 43C may have a substantially circular cross-section, half-circle cross-section or quarter-circle cross-section, respectively. Alternatively, line lens 43D may have a compound cross-section, which includes a rectangle connected to a quarter-circle.

Accordingly, when laser level 10 is disposed against a wall, laser assembly 40 will preferably emit a laser plane that contacts the wall, forming a laser line on the wall. Persons skilled in the art will recognize that it is preferable to orient the laser assemblies 40 in such manner so that at least a portion of the laser plane will contact the wall. In addition, persons skilled in the art will recognize that providing laser assemblies 40 on the pendulum assembly 30 discussed above will preferably result in laser level 10 projecting substantially horizontal laser lines against the wall (and a substantially vertical laser beam if a laser assembly 40 is disposed above knife edge 11IK and is directed upwardly).

Persons skilled in the art will recognize that line lenses 43B, 43C, 43C will limit the angle of plane divergence. In other words, if a horizontal line HL is 0°, the plane exiting from line lens 43A may extend from, for example, −30° to 30°, providing an angle of plane divergence DA of 60°. On the other hand, the plane exiting from line lenses 43B, 43C, 43D may extend from, for example, 0° to 30°, providing an angle of plane divergence DA of 30°. This provides for a more efficient use of the laser beam, directing more energy towards the wall, rather than away from the wall. Persons skilled in the art will recognize that directing more energy towards the wall is preferable as it would result in a brighter laser line on the wall.

A preferred laser assembly 40' is shown in FIG. 4, where like numerals refer to like parts. Such laser assembly 40' has a collimating lens 44 disposed in the laser beam path, as well as a line lens 45 disposed in the laser beam path after the collimating lens 44. Line lens 45 is preferably a prismatic lens that includes at least two cylindrical lens forms with significantly different focal distances to generate at least two superimposed laser planes with different divergence angles and trajectories.

With such arrangement, when laser assembly 40' is placed near a wall W, two or more lines are projected onto wall W. At least one of these lines (L1) may be directed to strike the wall W at a short distance along the wall surface, while another of these lines (L2) may be directed to strike the wall W at a longer distance. This preferably increases the overall length and/or apparent brightness of the laser line shown on the wall W. Lines L1, L2 may partially overlap or may be separated to further increase the length of the resulting laser line on wall W.

As mentioned above, line lens 45 may have two portions. One portion has a long focal distance for generating the high density line L2, i.e., having a small divergence angle. The brightness of line L2 along wall W will depend of the divergence angle H, as the smaller the divergence angle, the brighter the line at a given distance.

But a small divergence angle H will result in a laser line gap on the wall W between the laser assembly 40' (and thus laser level 10) and the beginning of line L2. Accordingly, it is preferable to provide line lens 45 with a second portion with a short focal distance for generating a line L1 with lower density than the line L2, and thus having a larger divergence angle L. The larger divergence angle L will create a low density line L1 that will contact wall W closer to the laser assembly 40', thus reducing the laser line gap left by line L2.

Persons skilled in the art will recognize that the first and second portions will have a first and second radii R1, R2, respectively. Preferably, radius R1 is substantially larger than radius R2. Persons skilled in the art will know how to select the appropriate radii, as they must be selected based on the distance from the wall W to laser assembly 40', the desired length of laser line gap to fill up, etc.

Persons skilled in the art will recognize that the laser beam LB created by the collimating lens 42 has a generally oval cross-section. The use of the long axis of the oval allows easier positioning of the beam to pass the two portions of line lens 45. It is desirable to orient the laser beam LB so that the short axis of the oval is aligned in the axis of the line lens 45 that offers no or minimal magnification. Accordingly, the short axis preferably provides the width of laser lines L1, L2. Persons skilled in the art will recognize that a narrower width is preferable as it increases accuracy and intensity of the laser lines. In a preferred embodiment, the short and long axes are about 3 mm and about 7 mm respectively.

Figure 4A:
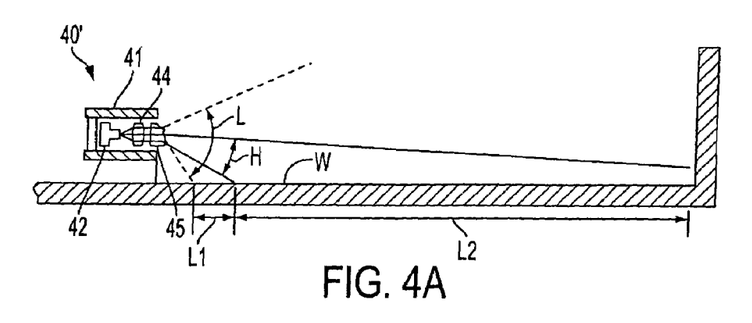
FIG. 4A is a partial cross-sectional top view of such arrangement.
Figure 4B:
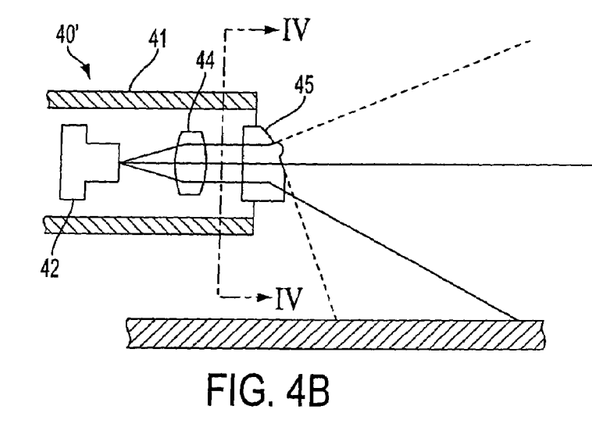
FIG. 4B is an augmented view of FIG. 4A.
Figure 4C:
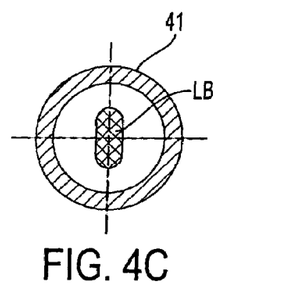
FIG. 4C is a partial cross-sectional view along line IV—IV of FIG. 4B.
Figure 4D:
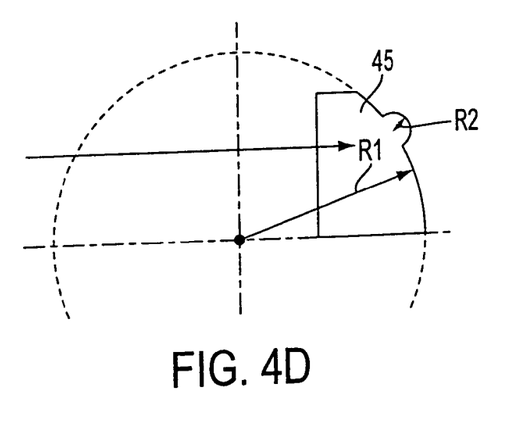
FIG. 4D is an augmented top drawing of the lens in FIG. 4A.
Figure 4E:
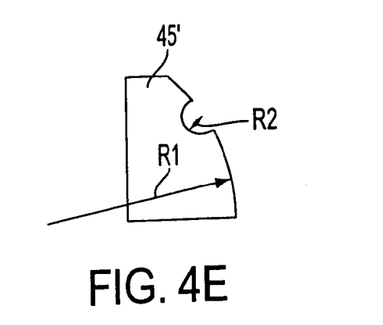
FIG. 4E is an augmented top drawing of a first alternate lens.
Figure 4F:
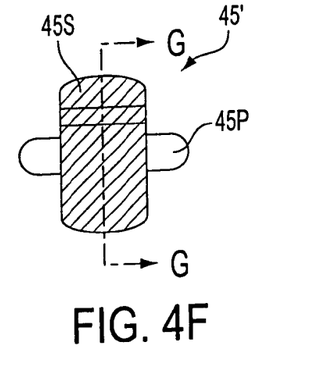
FIG. 4F is a front view of a second alternate lens.
Figure 4G:
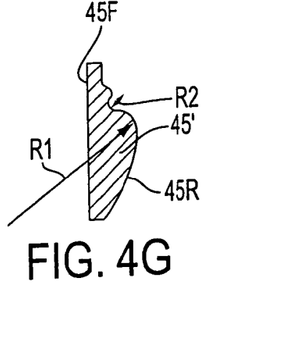
FIG. 4G is a cross-sectional view along line G—G of FIG. 4F.

Persons skilled in the art will also recognize that the above discussion is preferably applicable to line lens 45, as well as to alternate line lens 45' (FIGS. 4E–4G), except that the second portion with R2 is concave, i.e., extending into the lens, rather convex, i.e., extending out of the lens. In the embodiment of FIGS. 4F–4G, line lens 45' has radii R1, R2 of about 12.70 mm and about 0.75 mm, respectively.

It may also be preferable to provide line lens 45' with protrusions 45P to engage barrel 41.

Furthermore, it is preferable to provide a means of line lens 45' to delimit the width of the laser plane generated by laser assembly 40'. One such means is by providing a screen 45S on the wall 45F closest to laser diode 42. With such screen 45S, the shape or width of the emitted laser plane can be controlled. For example, screen 45S can define an unscreened line through which the laser beam is transmitted.

In the present embodiment, screen 45S is basically a texture molded onto wall 45F. However, persons skilled in the art will recognize that screen 45S can be an opaque material, such as paint, metal or fabric, which is disposed on or adjacent to line lens 45'. Furthermore, screen 45S could be disposed on or adjacent to wall 45R, or within line lens 45'. Alternatively, screen 45S can be disposed ahead of lens 44.

Figure 5A:
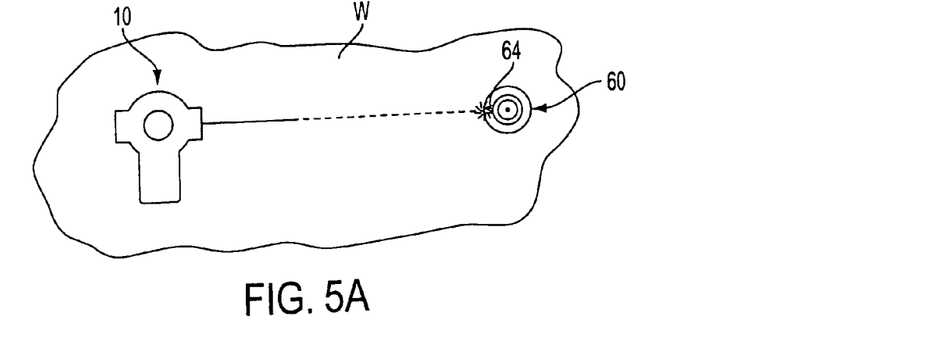
FIGS. 5A–5B are front and top views, respectively.
Figure 5B:
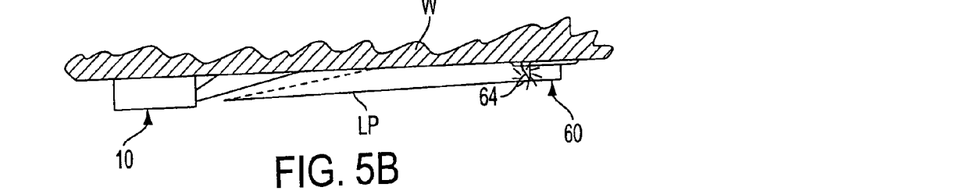

Referring to FIG. 5, regardless of the type of line lens used, it is likely that the laser line will fade as it gets farther from laser level 10. As shown in FIG. 5B, the emitted laser plane LP still has a component that does not contact the wall W. This component will form a laser line when it contacts another surface.

Figure 6A:
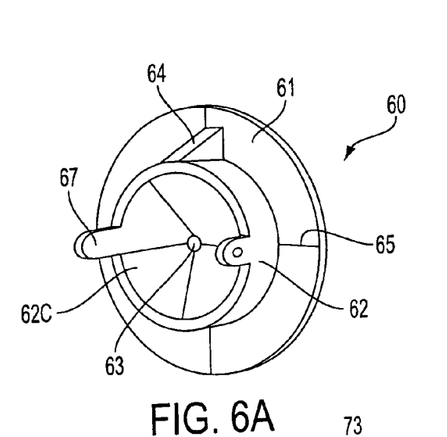
FIGS. 6A–6B show the target independently and with the laser level, respectively.

Accordingly, it is preferable to provide a surface that can intersect this component of the laser plane LP. This surface can be provided on a movable target 60. Target 60 may have a main body 61, and a cylinder 62 disposed on the body 61. Preferably, the inside of cylinder 62 is carved out, forming a hollow cone 62C ending in a central bore 63. Target 60 may have cross-hair indicia, such as grooves 65 or ribs, intersecting at the center of bore 63.

Persons skilled in the art will recognize that target 60, main body 61 and/or cylinder 62 may be made of a translucent material to facilitate location of a mark. This could facilitate placing the laser level 10 on a specifically desired location.

A ramp 64 may be provided on cylinder 62. Preferably the ramp 64 has some reflective material. (Alternatively, textured areas can be disposed on cylinder 62 or ramp 64 to enhance the visibility of the laser line.) Accordingly, the user can disposed the laser level 10 on wall W and move target 60 until ramp 64 is aligned with the laser line.

The user can then use a pencil to mark the center of target 60. Alternatively, the user can push a pin 66P or expanding mandrel 66M through bore 63 to maintain the target 60 in place. Persons skilled in the art will recognize that an expanding mandrel has at least two metal strips along its longitudinal axis meeting at a front tip. The mandrel is inserted into a pre-drilled hole. The steel strips can be then expanded within the hole in order to fix the mandrel.

Figure 6B:
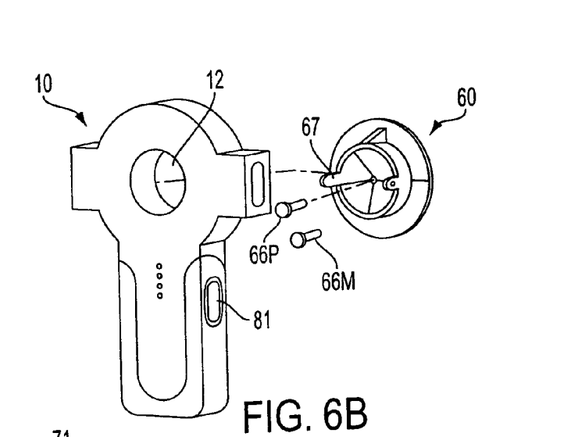

Persons skilled in the art will recognize that target 60 may be removably disposed in hole 12 of laser level 10. Thus, laser level 10 provides on-board storage for target 60. To this end, it is preferable to provide target 60 with detent protrusions 67, which engage the laser level 10.

Persons skilled in the art will recognize that, if the center of hole 12 is aligned with the horizontal lines emitted by the laser assemblies 40, the bore 63 of target 60 will be placed at the intersection of the vertical centerline of laser level 10 with the horizontal lines. In addition, the laser level 10 may be hung by pushing a pin through bore 63 and nesting laser level 10 unto target 60.

Figure 7:
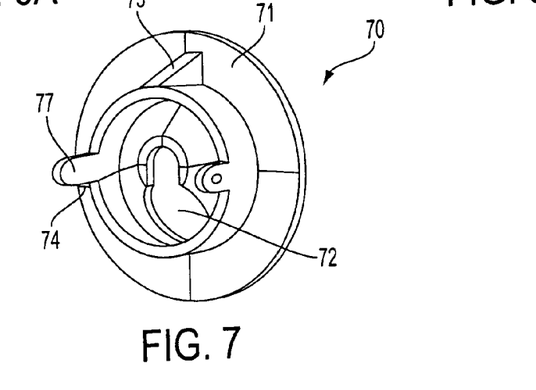
FIG. 7 is a wall hanging assembly for the laser level.

It may also be preferable to provide a hanger assembly 70 for laser level 10. Hanger assembly 70 may have a main body 71 with a central hole 72 for receiving the head of a nail hammered into a wall. Main body 71 may be made of a translucent material to facilitate location of a mark or nail.

Hanger assembly 70 may also have a ramp 73, as cross-hair indicia, such as grooves 74 or ribs, intersecting at the center of hole 72. Textured areas can be disposed on main body 71 or ramp 73 to enhance the visibility of the laser line.

Hanger assembly 70 may be removably disposed in hole 12 of laser level 10. To this end, it is preferable to provide hanger assembly 70 with detent protrusions 77, which engage the laser level 10.

Persons skilled in the art will recognize that housing 11 may be provided with holes for receiving nail heads or screw heads, for hanging laser level 10 thereon.

Figure 14:
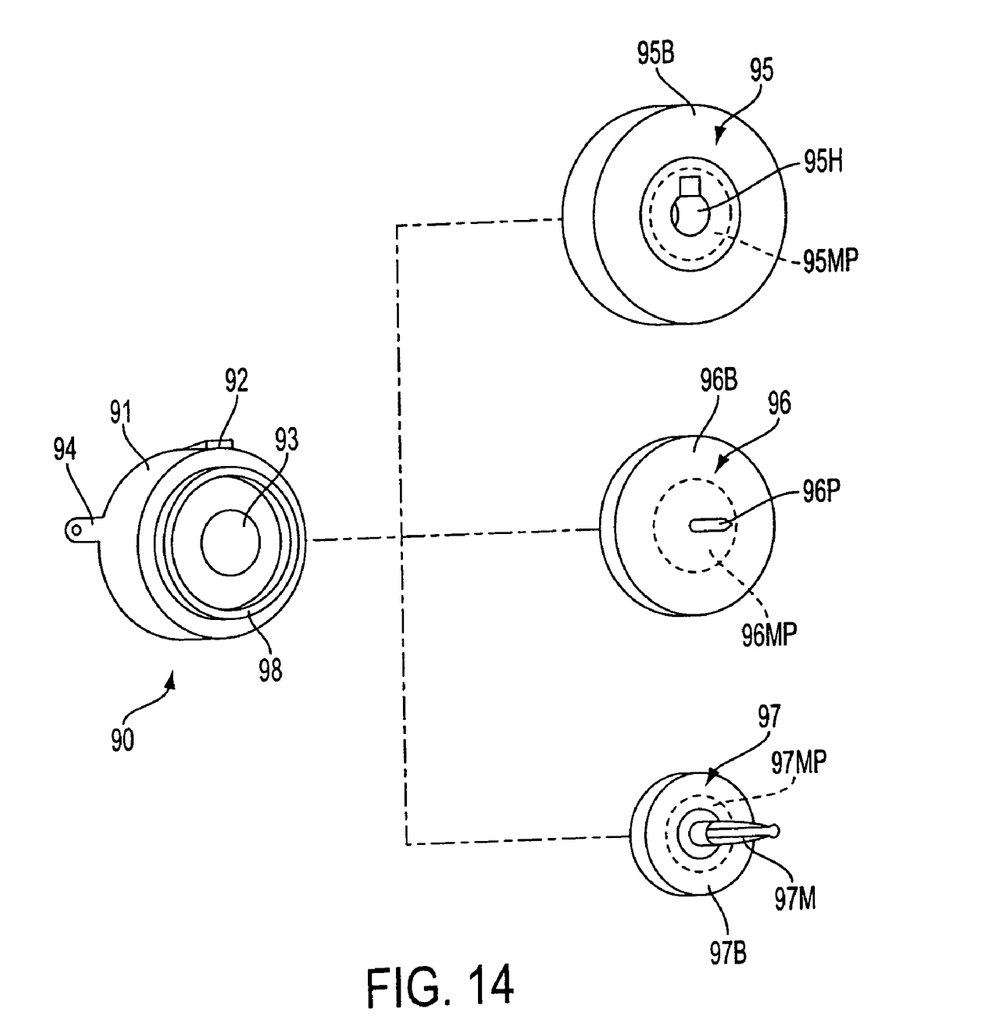
FIG. 14 illustrates another wall hanging assembly for the laser level.

It may also be preferable to provide a separable hanger assembly 90 for laser level 10. Hanger assembly 90 may have a main body 91, a magnet 93 disposed on the main body 91, and a ramp 92. Main body 91 may also have cross-hair indicia, such as grooves or ribs, intersecting at its center. Hanger assembly 90 may be removably disposed in hole 12 of laser level 10. To this end, it is preferable to provide hanger assembly 90 with detent protrusions 94, which engage the laser level 10.

Main body 91 may magnetically engage another assembly, such as wall assembly 95, pin assembly 96 and/or mandrel assembly 97. Wall assembly 95 preferably has a body 95B, a magnetically-responsive metal plate 95MP supported by body 95B, and a hole 95H. Basically, the user can dispose wall assembly 95 on a nail or screw on a wall. The user can then dispose main body 91 unto wall assembly 95, which will stay together because of the magnet/metal plate combination.

Pin assembly 96 preferably has a body 96B, a magnetically-responsive metal plate 96MP supported by body 96B, and a pin 96P. Basically, the user can dispose pin assembly 96 unto a wall. The user can then dispose main body 91 unto pin assembly 96, which will stay together because of the magnet/metal plate combination.

Mandrel assembly 97 preferably has a body 97B, a magnetically-responsive metal plate 97MP supported by body 97B, and a mandrel 97M. Basically, the user can dispose mandrel assembly 97 within a pre-drilled hole on a wall. The user can then dispose main body 91 unto mandrel assembly 97, which will stay together because of the magnet/metal plate combination.

Persons skilled in the art will recognize that it is also preferable to provide a rib 98 on main body 91 that receives wall assembly 95, pin assembly 96 and/or mandrel assembly 97, or a portion thereof. Preferably, the rib 98 is designed so that, when main body 91 is disposed on wall assembly 95, pin assembly 96 and/or mandrel assembly 97, the main body 91 is centered relative to the opposite assembly. Rib 98 may also support main body 91 (and thus laser level 10). Persons skilled in the art will recognize that the rib 98 may be disposed on wall assembly 95, pin assembly 96 and/or mandrel assembly 97. Alternatively, rib 98 may be received within a slot or groove of wall assembly 95, pin assembly 96 and/or mandrel assembly 97.

Figure 8B:
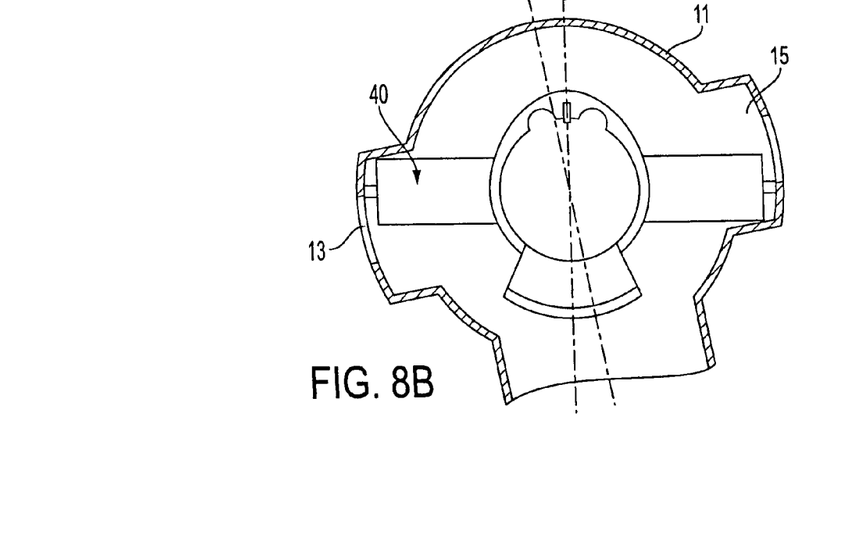

A second embodiment of laser level 10 is shown in FIG. 8, where like numerals refer to like parts. The teachings of the first embodiment above are wholly incorporated by reference in the present embodiment. One difference from the previous embodiment is that the pendulum assembly 30 has a knife edge 36 disposed therein, which engages a notch 11N in housing 11. In addition, pendulum assembly 30 may have a lower curved area 35.

It is preferable to dispose laser assemblies 40 within protrusions 15 of top portion 11T. With such arrangement, when the laser level 10 is disposed substantially vertically against a wall, laser beams emitted by laser assemblies 40 can exit housing 11 through windows 13. As discussed above, the laser level 10 has a certain angle range, where the laser level 10 can be disposed at an angle relative to the vertical centerline V and the pendulum assembly 30 will self-level and emit substantially horizontal (or vertical) laser beams.

If the laser level 10 is disposed at an angle beyond the angle range, laser assemblies 40 may contact the inner walls of protrusions 15. Alternatively, pendulum assembly 30 may contact a component disposed within housing 11. When this occurs, the laser level 10 will no longer provide an accurate leveling function.

Preferably, the windows 13 are sized to prevent the emitted laser beams to project out of housing 11 when the laser assemblies 40 contact the inner walls of protrusions 15 or pendulum assembly 30 contacts a component disposed within housing 11. This prevents the user from believing that the emitted laser beams are substantially horizontal (or vertical).

Preferably, the windows 13 prevent the laser beams from exiting the housing when the pendulum assembly 30 approach the limits of the angle range. In other words, assuming an angle range being between about −10° to about 10° from vertical centerline V where pendulum assembly 30 will self-level, and where the laser assemblies 40 contact the inner walls of protrusions 15 or pendulum assembly 30 contact a component disposed within housing 11 at any angle beyond this angle range, it may be preferable to size and/or shape the windows 13 to begin blocking the laser beams at about −8° and/or about 8° from vertical centerline V.

Figure 9:
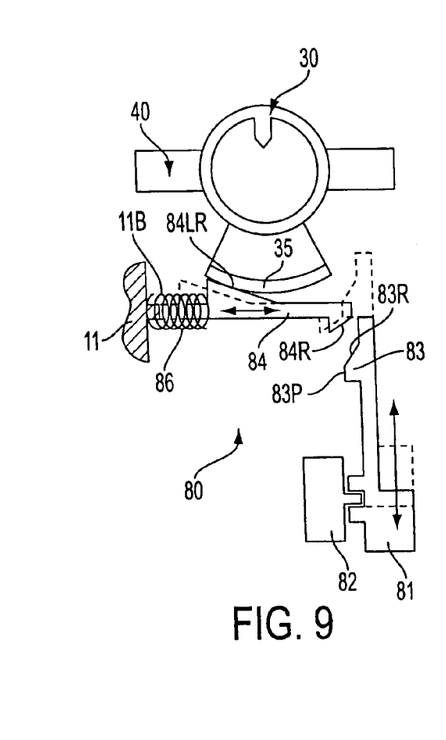
FIG. 9 illustrates a pendulum lock mechanism according to the invention.

It may be preferable to provide a pendulum lock mechanism 80 for locking pendulum assembly 30 at a certain position. For example, pendulum assembly 30 may be locked in place in order to safely transport laser level. Pendulum lock mechanism 80 may include a lock 84 that has a locking surface 84LR which contacts a portion of pendulum assembly 30, such as curved area 35. Lock 84 is preferably movable along its axis between locked and unlocked positions. A spring 86 may be trapped between housing 11 (via boss 11B) and lock 84 for biasing lock 84 towards the locked position.

Lock 84 may be moved between the locked and unlocked positions by an actuator 83. The longitudinal axis of actuator 83 is preferably substantially perpendicular to the longitudinal axis of lock 84. Actuator 83 may be moved along its axis between a first position that moves lock 84 into the locked position and a second position that moves lock 84 into the unlocked position. Preferably, actuator 83 and lock 84 have ramps 83R, 84R, respectively, for contacting therebetween.

As shown in FIG. 9, actuator 83 is shown in the first and second positions with solid and broken lines, respectively. As actuator 83 is moved upwardly, ramp 83R contacts ramp 84R, and moves lock 84 towards the unlocked position. Actuator 83 may have a plateau 83P disposed at the end of ramp 83R for maintain lock 84 in the unlocked position.

Actuator 83 may have an actuator button 81 to enable the user to move the actuator 83 between the first and second positions (and thus to move the lock 84 between the locked and unlocked positions).

Persons skilled in the art will recognize that actuator 83 may be connected to a switch 82, so that when actuator 83 is moved, switch 82 is activated. Preferably, switch 82 turns laser assemblies 40 on and off.

Persons skilled in the art should also recognize that the spatial relationship between actuator ramp 83R, lock ramp 84 and the travel distance of switch 82 can be manipulated so that the switch 82 will turn on laser assemblies 40 only when lock 84 is moved to the unlocked position. Alternatively, the spatial relationship between actuator ramp 83R, lock ramp 84 and the travel distance of switch 82 can be manipulated so that the switch 82 will turn on laser assemblies 40 before lock 84 is moved to the unlocked position. This allows the user to use the laser level 10 to emit straight laser lines, even though these lines are not necessarily level.

A third embodiment of laser level 100 is shown in FIG. 10, where like numerals refer to like parts. The teachings of the embodiments discussed above are incorporated herein by reference.

Laser level 100 basically has three assemblies: base assembly 110, pendulum assembly 120 and laser housing assembly 130. These three assemblies may be designed so that they cannot be separated during operation. Alternatively these three assemblies may be designed so that they can be separated during operation and/or storage.

Base assembly 110 has a main body 111, which has a substantially flat rear wall to ensure that laser level 100 can be disposed substantially flush against a wall. Main body 111 may a central hollow cylinder 1112. In addition, main body 111 may carry the stud sensor circuit 20.

Pendulum assembly 120 preferably has a main body 121 and a hole 121H on body 121 for nesting pendulum assembly 120 on cylinder 1112. Preferably, main body 121 (and thus pendulum assembly 120) can rotate about cylinder 112. Accordingly, it is preferable to dispose bearings 123 therebetween to facilitate such rotation.

Main body 121 may have a compartment for receiving battery 50. In addition, main body 121 may have an annular protrusion 122.

Laser housing assembly 130 may have a housing 131 and at least one laser assembly 40 disposed within the housing 131. Housing 131 may have a hole 131H for nesting laser housing assembly 130 onto protrusion 122. Preferably housing 131 (and thus laser housing assembly 130) can rotate about protrusion 122. Accordingly, it is preferable to dispose bearings 126 therebetween to facilitate such rotation.

A detent mechanism 140 may be disposed between pendulum assembly 120 and laser housing assembly 130 for fixing the rotational position of laser housing assembly 130 (and thus of laser assembly 40) relative to the pendulum assembly 120. Detent mechanism 140 may comprise a detent ball 144 which engages a notch (not shown) on housing 131. A spring 145 is preferably disposed between body 121 and ball 144 to bias ball 144 towards the notch. Persons skilled in the art will recognize that the spring 145 and ball 144 may alternatively be disposed on housing 131, whereas the notch can alternatively be disposed on body 121.

Figure 10A:
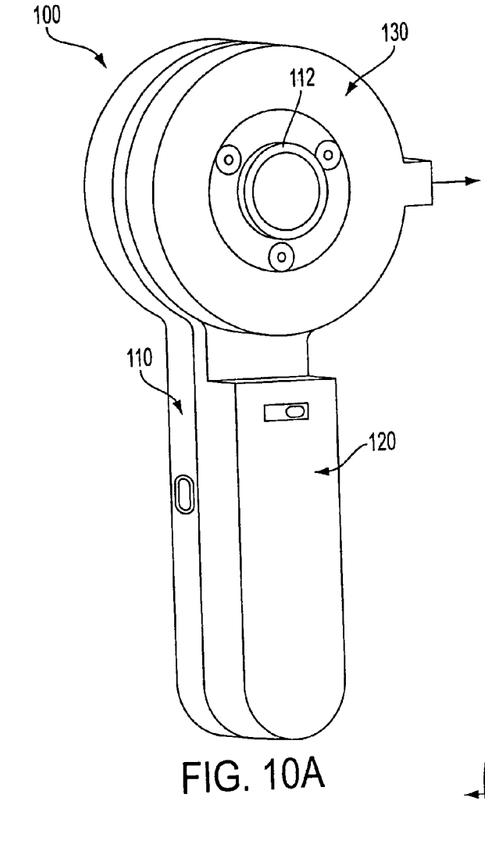
FIGS. 10A–10C show a laser assembly disposed on right, top and left positions, respectively.
Figure 10B:
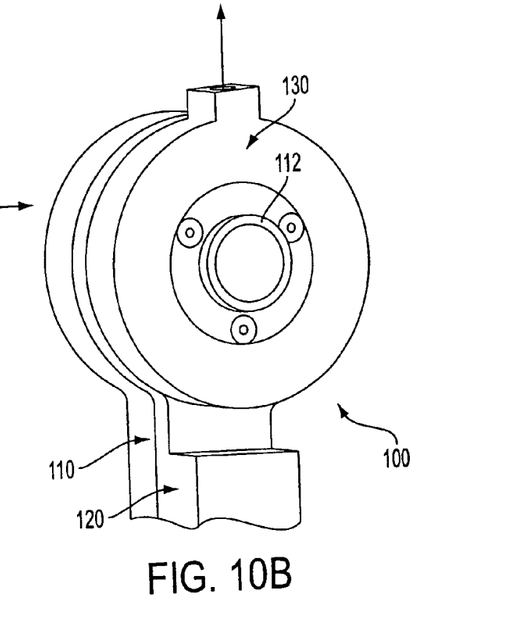
Figure 10C:
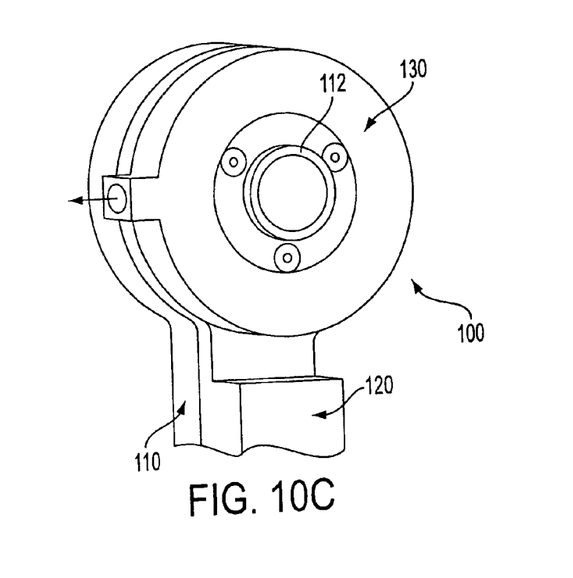
Figure 10D:
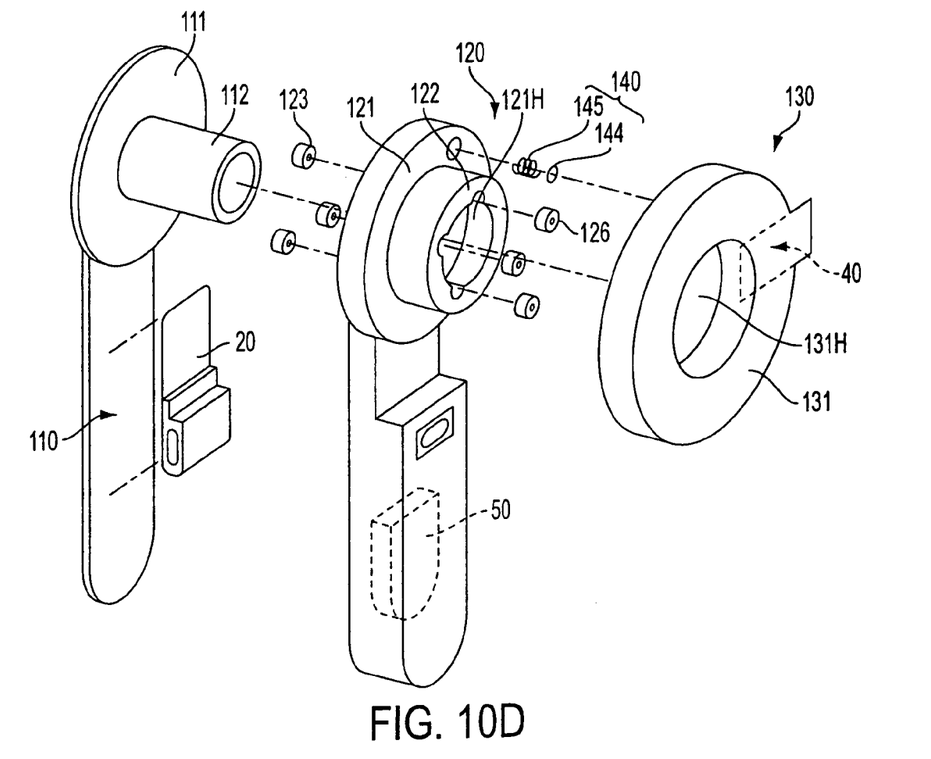
FIG. 10D is an exploded diagram of the laser level.

Preferably, the notches are disposed in such locations so that the laser assembly 40 will emit a laser beam that is at 90° of the vertical axis of pendulum assembly 120 (i.e., emitting a laser beam towards the right of laser level 100, as shown in FIG. 10A), at 0° of the vertical axis of pendulum assembly 120 (i.e., emitting a laser beam upwardly, as shown in FIG. 10B), or at −90° of the vertical axis of pendulum assembly 120 (i.e., emitting a laser beam towards the left of laser level 100, as shown in FIG. 10C). Persons skilled in the art will recognize that the notches may be disposed on other positions.

With such arrangement, the user can dispose laser level 100 against a wall. The user can move laser level 100 along the wall until a stud is detected by stud sensor circuit 20. While holding on to main body 111, the user can let pendulum assembly 120 and laser housing assembly 130 self-level, so that the emitted laser beam will be substantially horizontal or vertical. The user can also rotate laser housing assembly 130 to the different desired positions.

Figure 11:
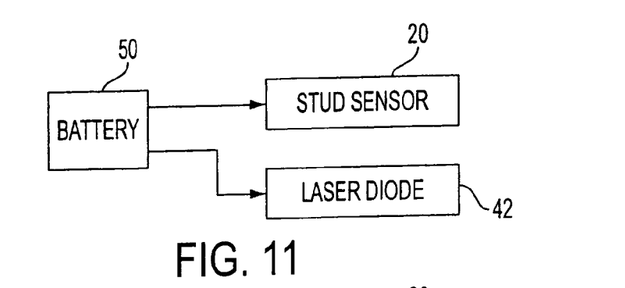
FIG. 11 is a block diagram of the components of the laser level.
Figure 12:
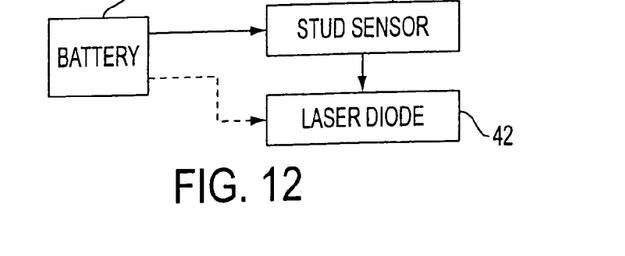
FIG. 12 is an alternate block diagram of the components of the laser level.

In all three embodiments, the battery 50 preferably provides power to both stud sensor circuit 20 and laser diode(s) 42, as shown in FIG. 11, so that the stud sensor circuit 20 and laser diode(s) 42 operate independently from each other. Persons skilled in the art will recognize that it may be desirable to enable the stud sensor 20 to control the laser diode(s) 42, so that the laser diode(s) 42 only turn on when a stud is detected by stud sensor 20.

Figure 13A:
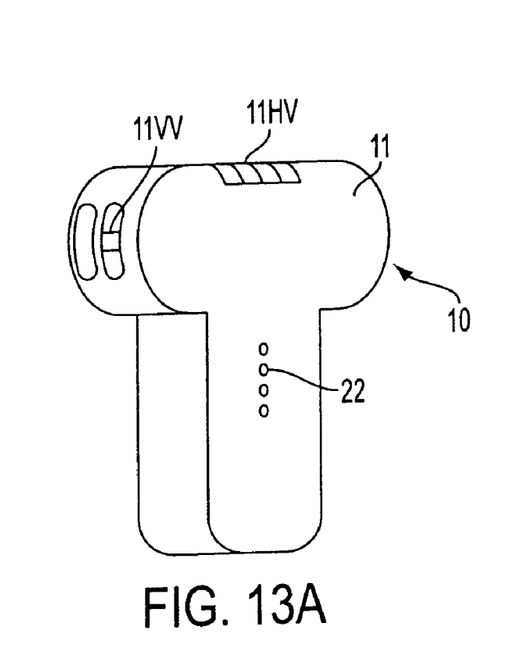
FIGS. 13A–13B are perspective and cross-sectional views of the laser level, respectively.
Figure 13B:
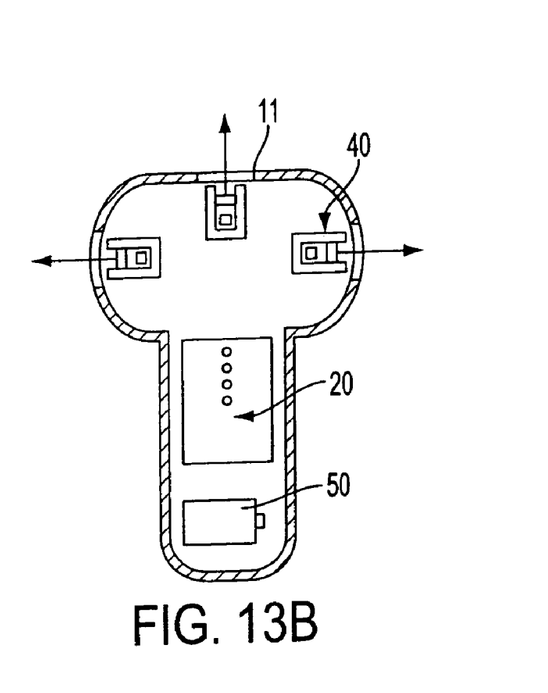

Another embodiment of the novel laser level is shown in FIG. 13, where like numerals refer to like parts. The teachings of the embodiments above are wholly incorporated by reference in the present embodiment. Like before, laser level 10 has laser assemblies 40 for projecting laser beams, preferably in the form of planes. Furthermore, laser level 10 has a stud sensor circuit 20.

In this embodiment, the main difference is that the laser assemblies 40 are not disposed on a pendulum. Instead, they are fixedly connected to housing 11. Accordingly, the user can disposed housing 11 at any position against a wall or floor, and two laser lines will be emitted unto the wall or floor.

A horizontal bubble vial 11HV may be provided on housing 11 to indicate to the user when the laser beams are level, i.e., substantially horizontal. Similarly, a vertical bubble vial 11VV may be provided on housing 11 to indicate to the user when the laser beams are plumb, i.e., substantially vertical. Persons skilled in the art will recognize that other means for detecting and indicating whether the laser beams are plumb or level can be used. In addition, persons skilled in the art will recognize that it may be preferable to dispose at least one laser assembly 40 at 90° from another laser assembly 40, to emit a perpendicular laser beam or line.

Persons skilled in the art may recognize other additions or alternatives to the means disclosed herein. However, all these additions and/or alterations are considered to be equivalents of the present invention.

The invention claimed is:

1. A level disposable on a substantially vertical reference surface comprising:
    a housing;
    a first light diode disposed in the housing for emitting a first light beam along a first path;
    a first lens disposed in the housing in the first path to adapt the first light beam into a first planar beam, the first planar beam forming a first line on the vertical reference surface;
    a detector circuit disposed in the housing for detecting a feature behind or underneath the vertical reference surface;
    a hanging assembly connected to the housing to mount the level to the vertical reference surface, the hanging assembly comprising a reference surface assembly that contacts the vertical reference surface; and
    a magnet disposed on one of the reference surface assembly and the housing, and a metal plate disposed on the other of the reference surface assembly and the housing, wherein said hanging assembly is connected to said housing via said metal plate and said magnet.

2. The level of claim 1, further comprising a second light diode disposed in the housing to emit a second light beam along a second path, and a second lens disposed in the housing in the second path to convert the second laser beam into a second planar beam, the second planar beam forming a second line on the reference surface, wherein said first and second planar beams do not intersect.

3. The level of claim 2, wherein the first and second lines are substantially perpendicular.

4. The level of claim 2, wherein the first and second lines are substantially parallel.

5. The level of claim 1, wherein the detector circuit detects at least one of the group consisting of studs, wire and pipes.

6. The level of claim 1, wherein the detector circuit controls the first light diode so that, upon detecting the feature, the first light diode lights up.

7. The level of claim 1, wherein the detector circuit does not control the first light diode.

8. The level of claim 1, wherein the first line is substantially horizontal.

9. The level of claim 1, wherein the reference surface assembly comprises at least one of the group consisting of a pin and a mandrel.

* * * * *